(12) United States Patent
Botero Montano

(10) Patent No.: US 11,374,329 B2
(45) Date of Patent: Jun. 28, 2022

(54) ELECTROMAGNETIC TOROIDAL IMPELLER

(71) Applicant: Rodrigo Botero Montano, Bogota (CO)

(72) Inventor: Rodrigo Botero Montano, Bogota (CO)

( * ) Notice: Subject to any disclaimer, the term of this patent is extended or adjusted under 35 U.S.C. 154(b) by 169 days.

(21) Appl. No.: 16/607,049

(22) PCT Filed: Apr. 26, 2018

(86) PCT No.: PCT/CO2018/000006
§ 371 (c)(1),
(2) Date: Oct. 21, 2019

(87) PCT Pub. No.: WO2018/196888
PCT Pub. Date: Nov. 1, 2018

(65) Prior Publication Data
US 2020/0176159 A1    Jun. 4, 2020

(30) Foreign Application Priority Data
Apr. 27, 2017  (CO) .................. NC2017/0004284

(51) Int. Cl.
*H01Q 13/18* (2006.01)
*H01F 6/04* (2006.01)
(Continued)

(52) U.S. Cl.
CPC ............... *H01Q 13/18* (2013.01); *H01F 6/04* (2013.01); *H01F 6/06* (2013.01); *H02N 11/006* (2013.01)

(58) Field of Classification Search
CPC .. H01F 6/06; H01F 6/04; H01Q 13/18; H02N 11/006; B64G 1/409; B64G 1/40; F03H 99/00
See application file for complete search history.

(56) References Cited

U.S. PATENT DOCUMENTS

| 2,460,286 A | * | 2/1949 | Hansen | ................. | H01Q 13/18 |
|  |  |  |  |  | 343/767 |
| 5,142,861 A |  | 1/1992 | Schlicher et al. |  |  |
| 6,404,089 B1 | * | 6/2002 | Tomion | ................ | H02N 11/006 |
|  |  |  |  |  | 310/162 |

FOREIGN PATENT DOCUMENTS

WO   2007089284 A1   9/2007
WO   2016162676 A1   10/2016

OTHER PUBLICATIONS ip.cpm.*

(Continued)

*Primary Examiner* — Mohamad A Musleh
(74) *Attorney, Agent, or Firm* — ArentFox Schiff LLP

(57) ABSTRACT

The invention relates to an electromagnetic toroidal impeller in the field of physics applied to electromagnetism. The invention comprises a cylindrical arrangement of superconducting antennas (9) which are separated by a dielectric (8) over a superconducting cylindrical plate (7) and exposed in a resonant cavity (6). The radiation in the cavity is incident on the force ring having a superconducting surface (4) containing ferrite (11), the coolant (5) introduced through the pipes (1) flowing through the toroidal interior of same. The force received in the ring (4) is transmitted via the supporting members (3) to the support (2). The cavity is thermally insulated with insulation (12) and is cooled with the liquid (10) through the pipes (14). The invention provides a device capable of generating driving force from the conversion of the energy available in electromagnetic waves that are contained in a resonant cavity.

8 Claims, 13 Drawing Sheets

(51) Int. Cl.
*H01F 6/06* (2006.01)
*H02N 11/00* (2006.01)

(56) References Cited

OTHER PUBLICATIONS

Global Dossier.*
International Search Report issued for PCT/CO2018/000006, dated Sep. 18, 2018 (2 pages).

* cited by examiner

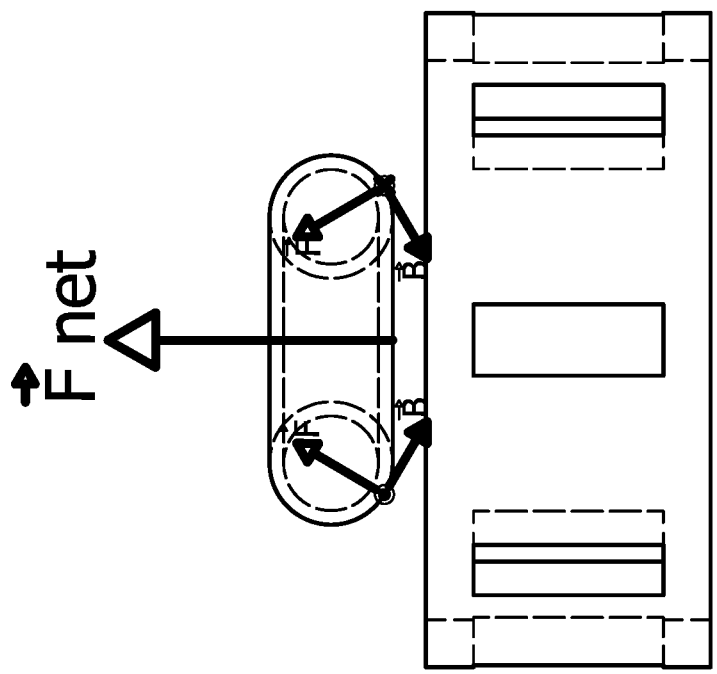
Figure 12
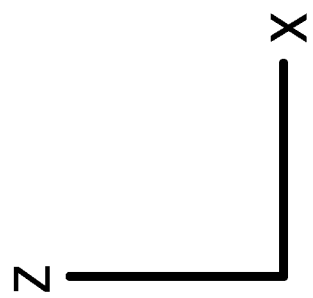

ELECTROMAGNETIC TOROIDAL IMPELLER

CROSS-REFERENCE TO RELATED APPLICATIONS

This application is a National Stage Entry of PCT/CO2018/000006, filed Apr. 26, 2018, which claims priority to CO Patent Application No. NC2017/0004284, filed Apr. 27, 2017, the disclosures of each of which are hereby incorporated by reference in their entireties.

BACKGROUND

Most existing mechanisms that provide thrust for various modes of transport are based on a conversion to mechanical energy coming from different energy sources. The mechanical energy necessary for the operation of land, sea and air modes of transport is mainly based on the conversion of fossil fuel energy in the combustion process thereof. Although recent initiatives contemplate the use of alternative energies, these likewise mostly require a conversion to mechanical energy in order to generate the necessary driving force.

In land transport, movement is achieved by applying a torque and an angular velocity to the wheel of the vehicle. In river and sea transport, this is achieved by displacing the environment in which the vehicle is located. Airplane turbines generate thrust by ejecting gases from the combustion of the mixture of air and fuel, said thrust generating the necessary effect that leads to aerodynamic lift. Also in spacecrafts, thrust has been provided by ejecting a gas.

Current estimations in the generation of energy to provide the driving force in different modes of transport have resulted in serious levels of pollution that are affecting the health of our planet. The causes of global warming need to be taken into account. The health of our cities is being seriously affected by high levels of pollution.

The best known and most controversial invention that obtains thrust from electromagnetic sources is the so-called "EmDrive."

FIG. 1 shows an experimental model of this thruster. The thruster uses a magnetron to produce microwaves that are directed to a metal, conical, fully enclosed vessel capable of isolating the radiation by operating as a resonant cavity.

The general theory is based on the interference of microwave frequency waves which, when injected sidewise into a resonant cavity, generate a sidewise thrust.

SUMMARY

The explanation for why the thrust occurs is the effect known as radiation pressure, an effect that is felt on the surface where the wave is reflected. The conical shape towards the right (according to the photograph) receives a larger number of wave reflections due to the smaller distances inside the conical cavity.

The technique used in the EmDrive is different from that used in the present invention. It is based on radiation pressure; it does not look for a specific concentration and geometry of the electric and magnetic fields. There is no horizontal polarization with multiple antennas on a cylindrical surface.

Like the EmDrive, the Cannae Drive uses electromagnetic waves in a resonant cavity, in this case asymmetric, as shown in FIGS. 3 and 4.

The system generates thrust by creating specific interactions between resonant electromagnetic waves and devices that transport excess electrical charges and/or devices that transport electrical currents.

The general idea is that a net unbalanced force is produced due to the interaction of electromagnetic waves with electrical charges on the surfaces of the resonant cavity. This unbalanced interaction due to the electromagnetic waves in a specific geometry of the chamber generates a net driving force. The technique used seeks an imbalance of forces, in an asymmetric cavity.

Like the EmDrive, the technique used differs from that used in the present invention. The cavity of the Cannae Drive is asymmetric, and does not seek a specific concentration and geometry to concentrate the electric and magnetic fields.

In the geometry proposed in the present invention, by supplying the necessary power, it is possible to achieve high levels of resonance that can provide significant thrust values.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 12 shows a net driving force, in accordance with aspects of the present disclosure.

DESCRIPTION OF THE INVENTION

In accordance with the disclosed situation and given that there are technologically known techniques that allow high precision in construction processes as well as advances in power management in high-frequency electronics, the invention provides a different energy conversion that directly harnesses the available energy supplied by electromagnetic waves so that a resonant cavity can supply the desired driving force.

The force that electric charges experience in an electromagnetic field is the force that is harnessed in the present invention. The Lorentz equation makes it possible to establish, as a vector, the force experienced by a charge q in an electromagnetic field, according to the equation:

$$F=qE+q(v \times B)$$

The general idea of the invention is to harness the energy of the radiated electrical field in order to impose a force that provides velocity to the electrical charges found on the surface of a superconducting ring. Said driven charges then receive the force provided by the energy of the magnetic field associated with the radiation. The geometry of the components in the present invention makes it possible to achieve significant power values given the resonance levels of the electromagnetic fields in the proposed cylindrical cavity.

Figure 1:
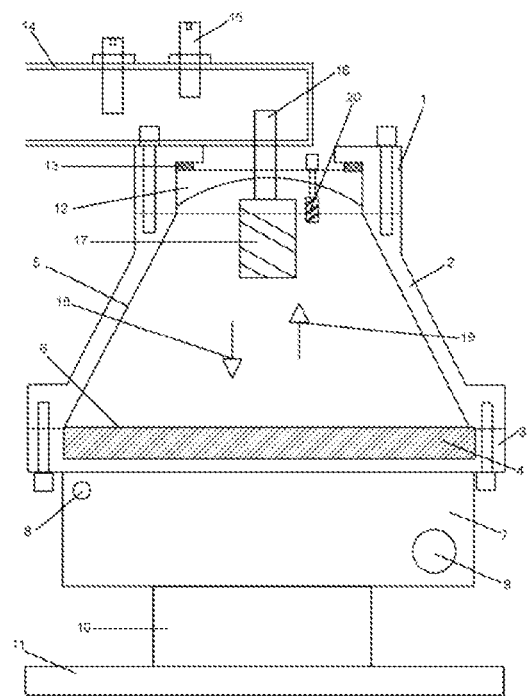
FIG. 1 shows a photograph of the EmDrive, in accordance with aspects of the present disclosure.
Figure 2:
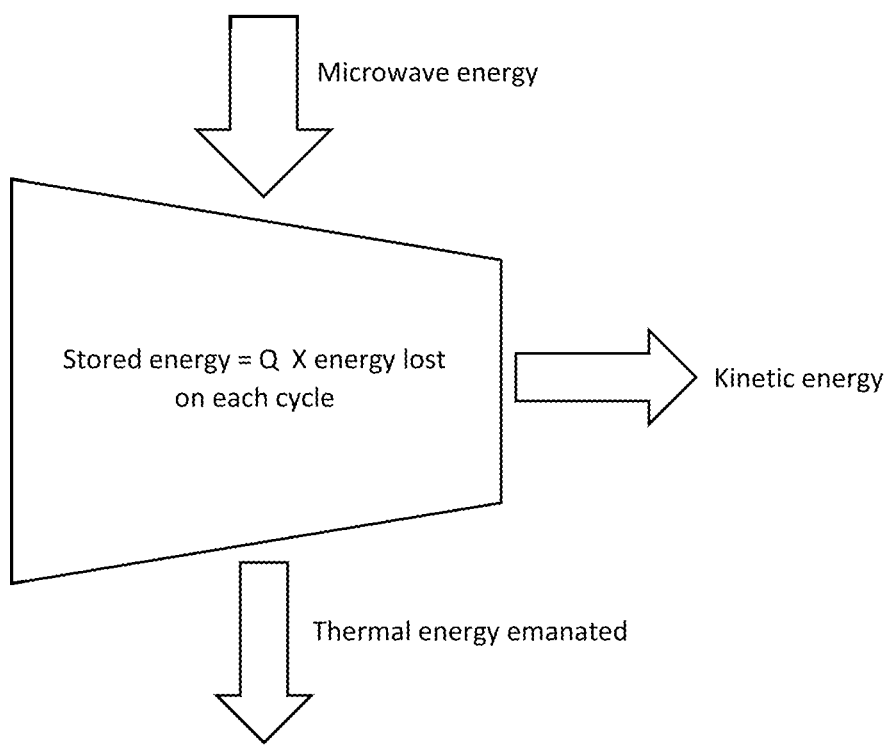
FIG. 2 shows an energy flux, in accordance with aspects of the present disclosure.
Figure 3:
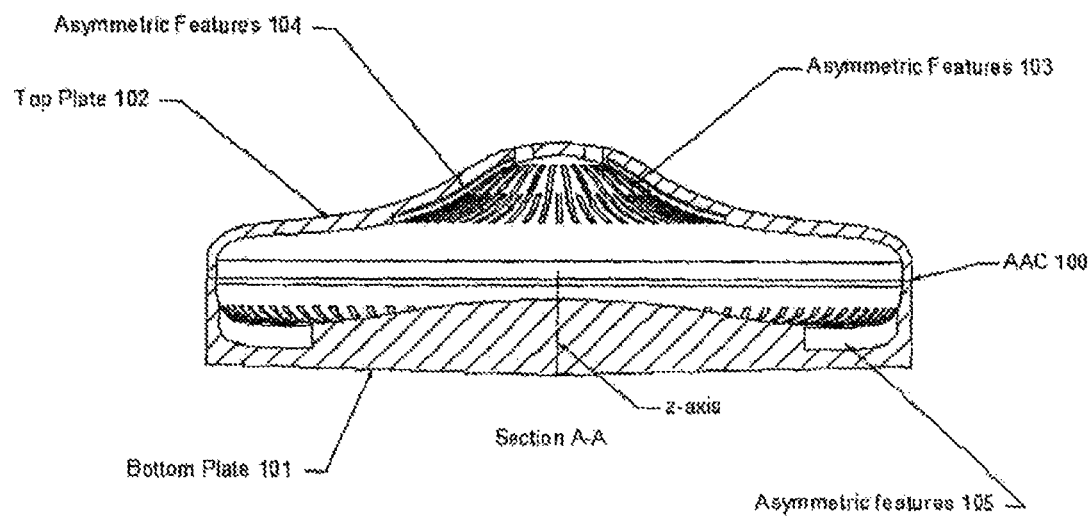
FIG. 3 shows a photograph of the Cannae Drive, in accordance with aspects of the present disclosure.
Figure 4:
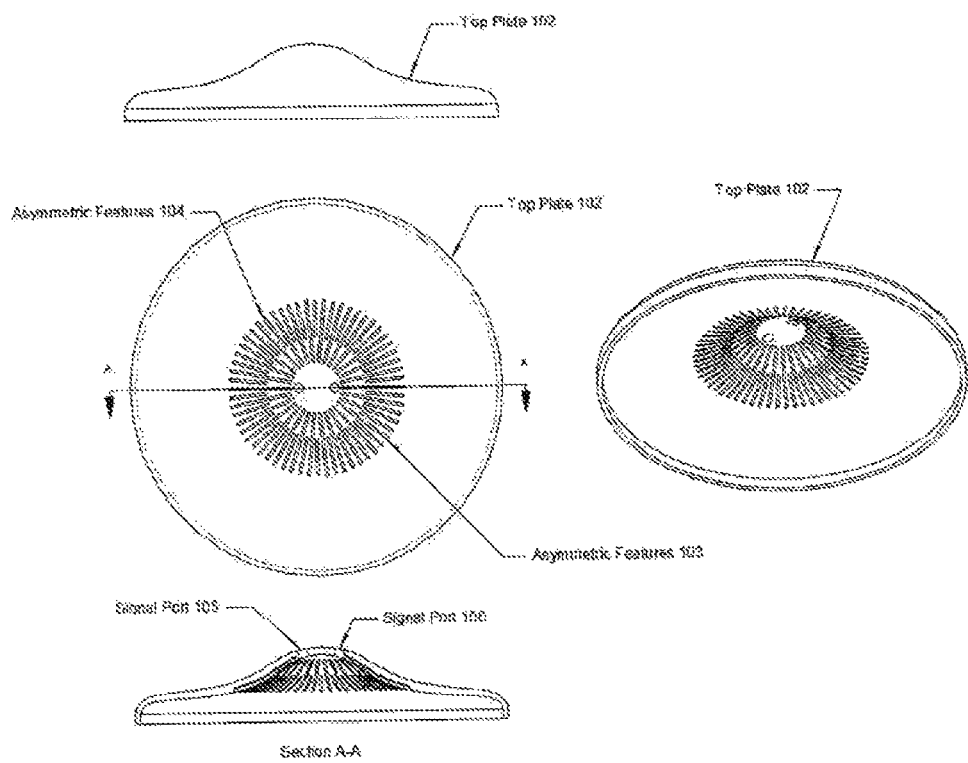
FIG. 4 shows a schematic diagram of the Cannae Drive, in accordance with aspects of the present disclosure.
Figure 5:
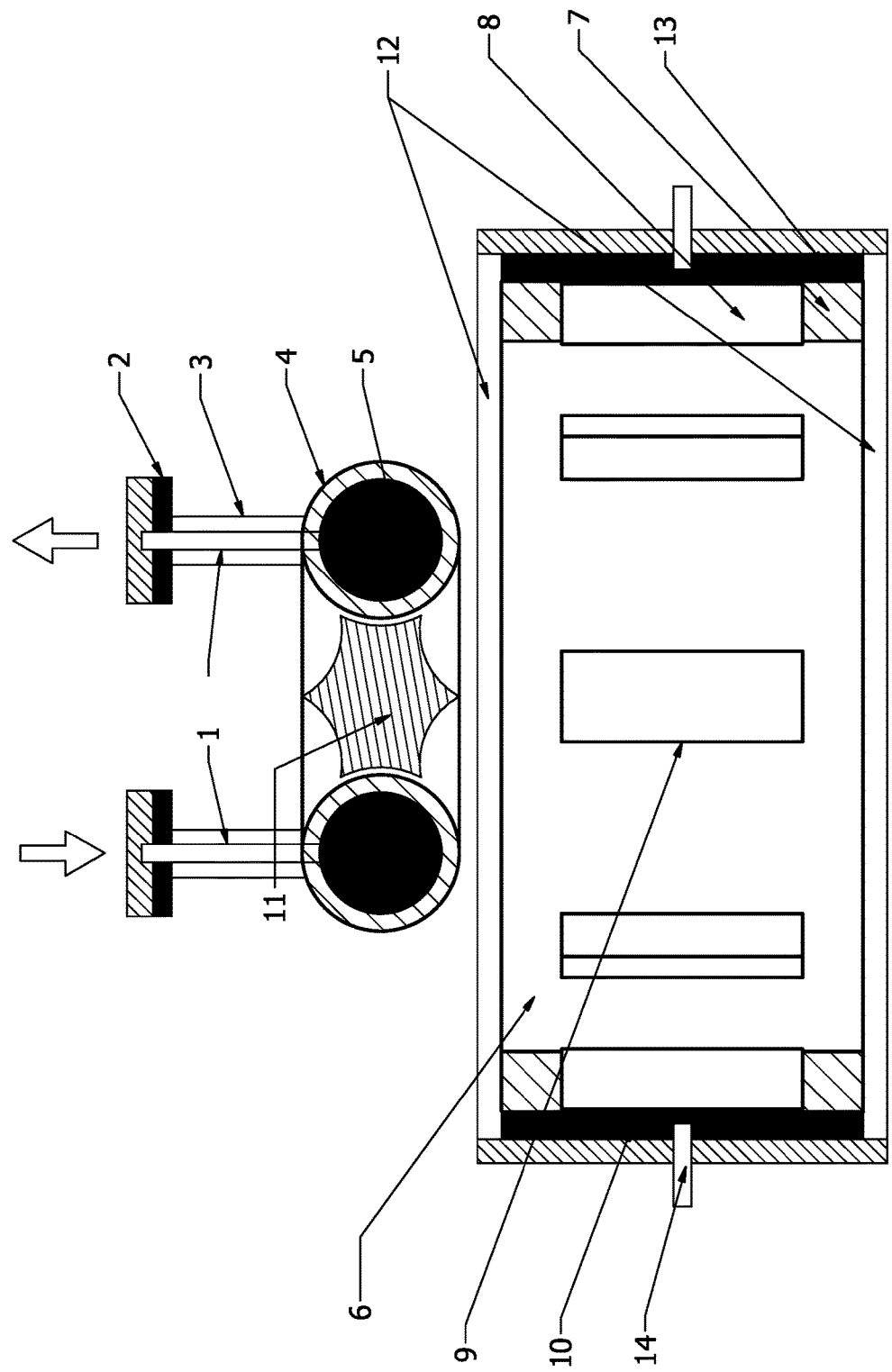
FIG. 5 shows a photograph of the Toroidal Electromagnetic Drive, in accordance with aspects of the present disclosure.

FIG. 5 shows a cross-section of the drive in a schematic diagram. According to FIG. 5, a cylindrical distribution of superconducting antennas (9) is provided, separated by a dielectric (8) located on a superconducting cylindrical plate (7), exposed in a resonant cavity (6). The radiation exposed by the cavity is incident on the force ring with superconducting surface (4) that contains the ferrite (11), the toroidal ring thereof containing the cooling liquid (5), which circulates through the ducts (1). The force received by the toroidal superconducting ring (4) is transmitted via the legs (3) to the support (2). The resonant cavity (6) is thermally insulated by the insulator (12) and is cooled through the ducts (14) by the cooling liquid (10).

Figure 6:
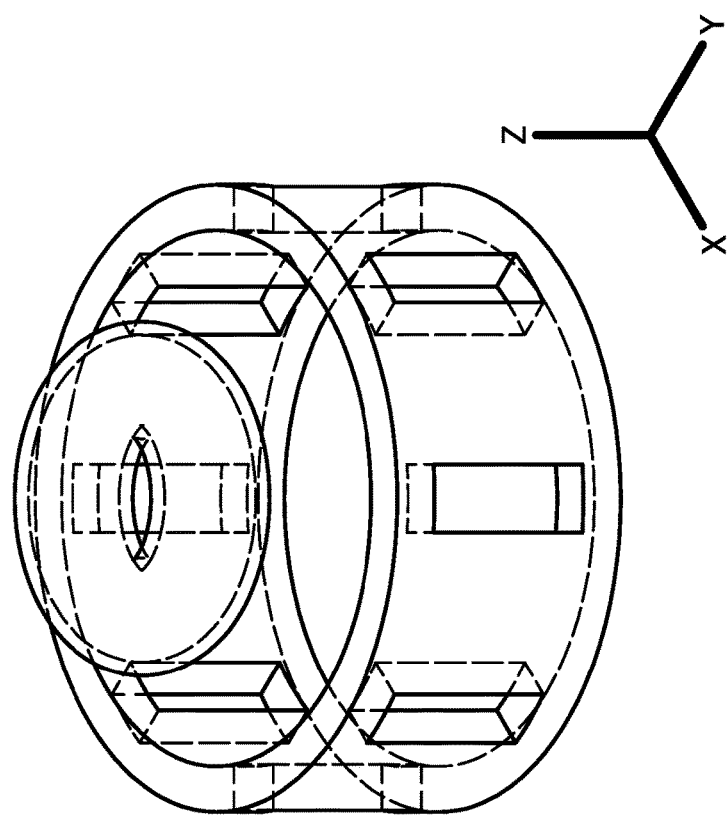
FIG. 6 is a 3D diagram, in accordance with aspects of the present disclosure.
Figure 6:
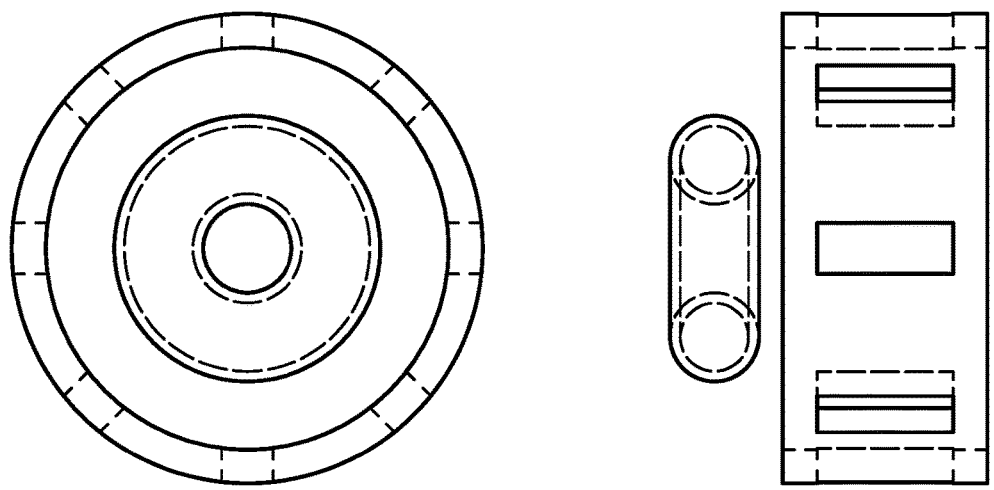

FIG. 6 shows a 3D representation of the antennas, the resonant cavity and the toroidal force ring.

The invention manages to produce a net driving force, as a result of the forces exerted by electrons or Cooper pairs that move in the toroidal force ring. The aim is thus to generate, in an ordered fashion, the radiation of electric and magnetic fields that provide the characteristic of maximizing the Lorentz equation:

$$F=qE+q(v \times B).$$

Figure 7:
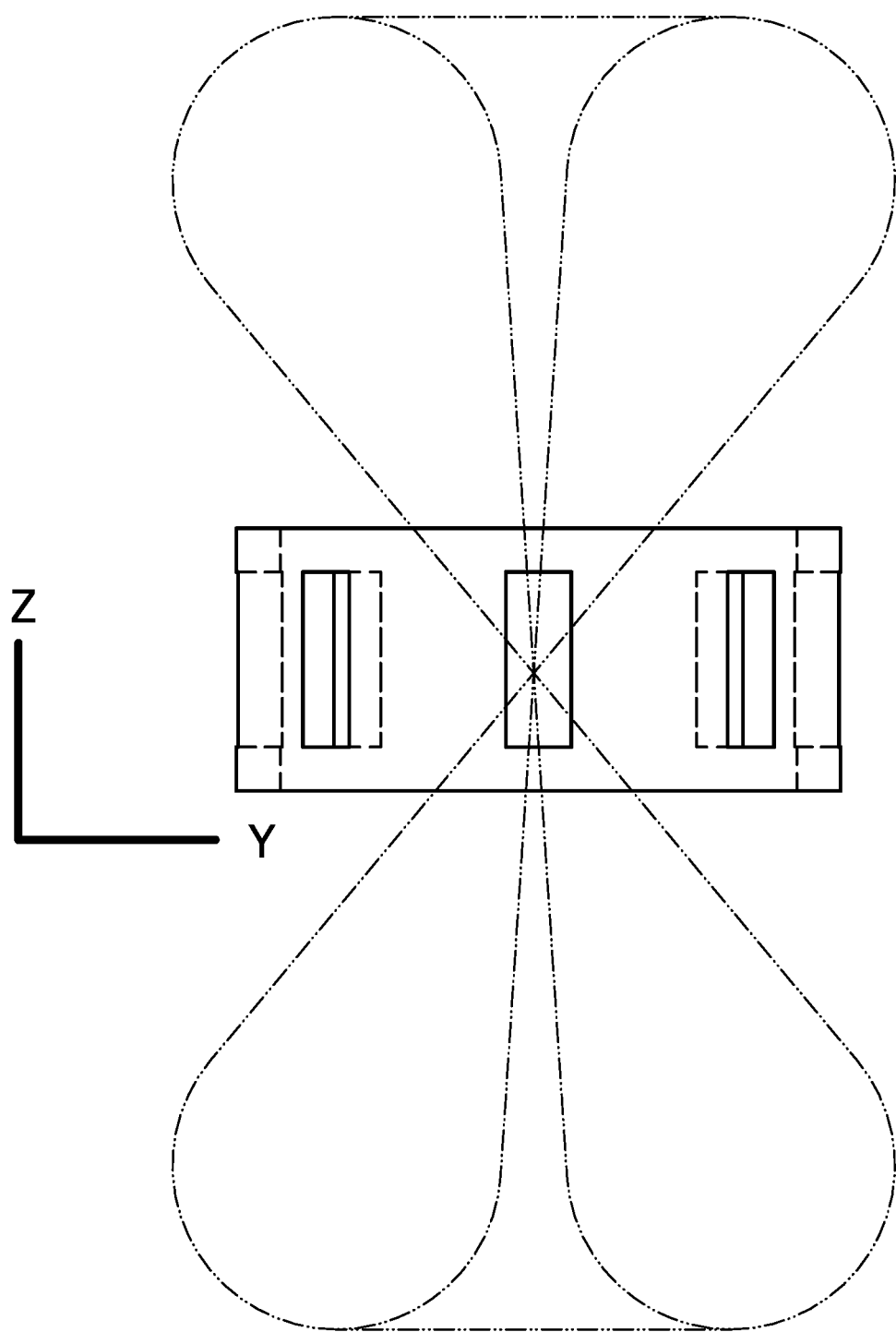
FIG. 7 shows radiation without force ring, in accordance with aspects of the present disclosure.

FIG. 7 shows the radiation pattern in the absence of the force ring. Said pattern is produced due to a synchronized signal in the antennas having a wavelength that approximates the diameter of the cavity.

Figure 8:
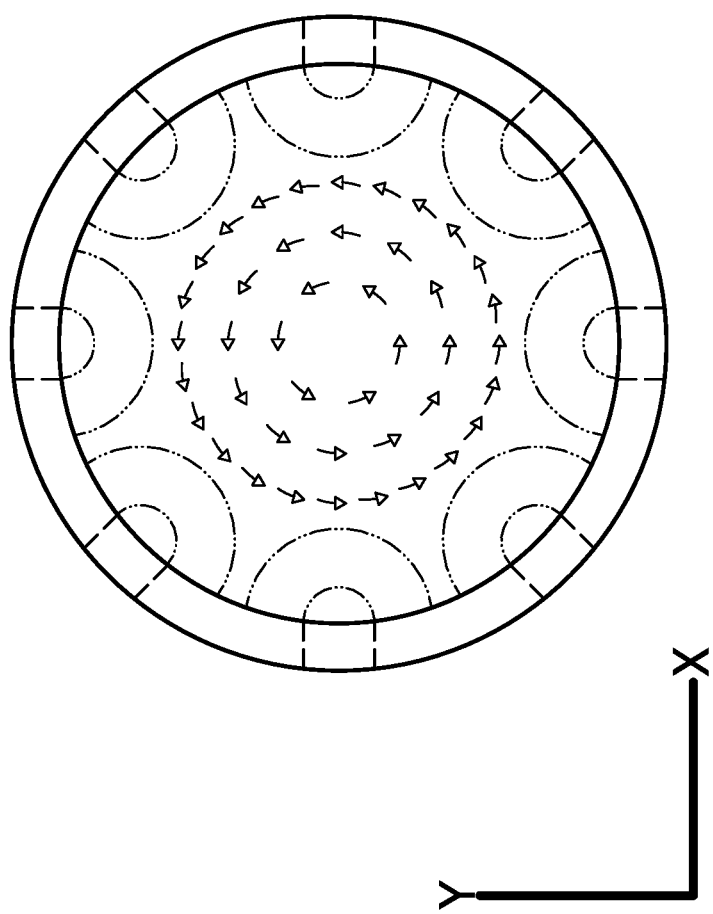
FIG. 8 shows an electric field in the cavity, in accordance with aspects of the present disclosure.

Proper polarization (electrical field in the x-y plane) allows the constructive interference of the emitted electromagnetic waves to produce in the resonant cavity the desired increase in the electric and magnetic fields. The electrical field (in the absence of the ring) in the plane (x-y) is shown in FIG. 8:

Due to the contribution of each antenna, the cross-section of the cavity shows that the electrical field changes its counter-clockwise and clockwise rotation according to the phase change of the signal. FIG. 8 shows the electrical field for the cavity of which the diameter approximates the length of the emitted waves. A cross-section across the plane (x-y), exactly at the center of the cavity, is shown.

Figure 9:
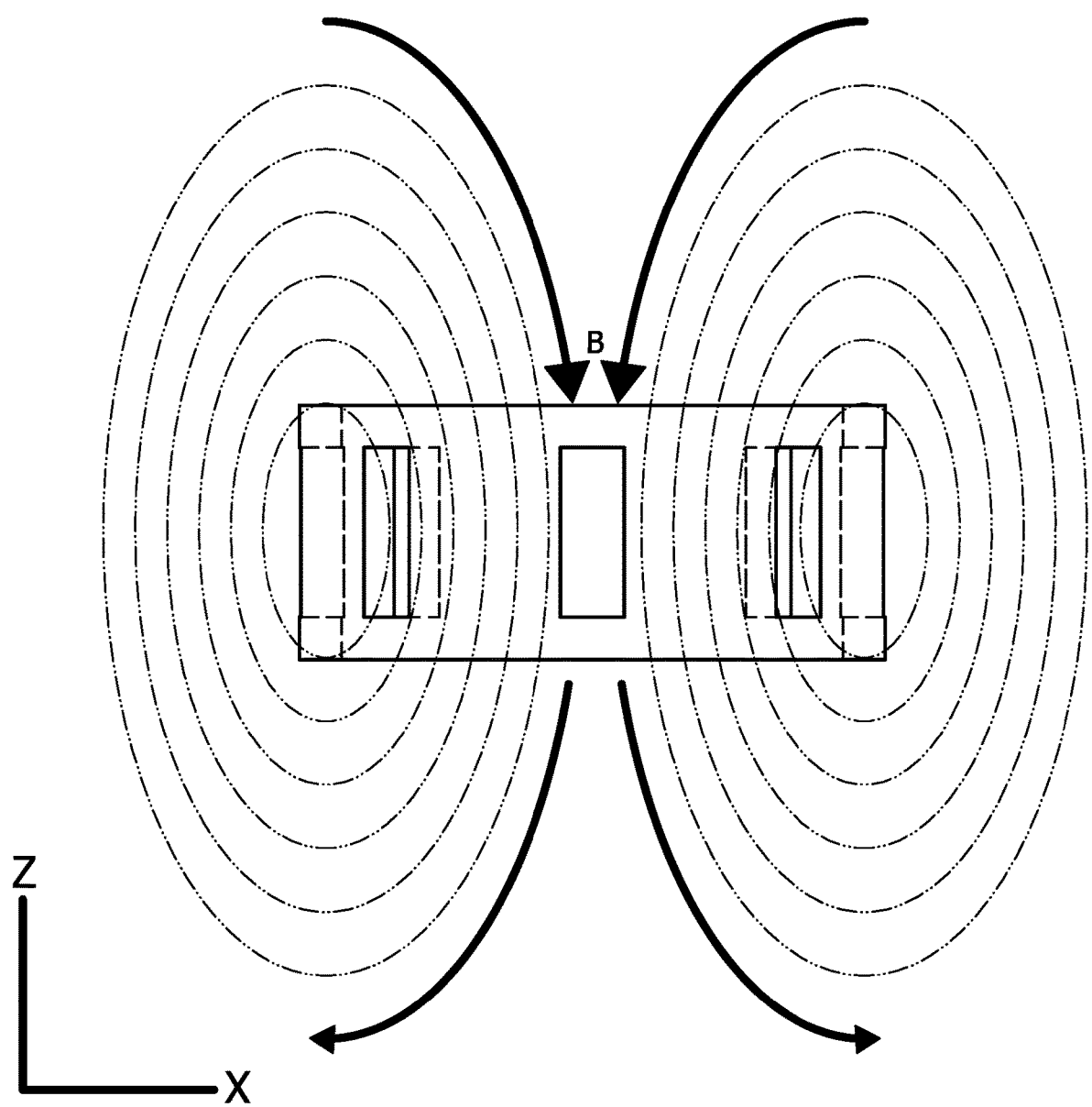
FIG. 9 shows a magnetic field in the cavity, in accordance with aspects of the present disclosure.

FIG. 9 shows (in the absence of the ring), on the planes (y-z) and (x-z), the magnetic field for the same instant.

Figure 10:
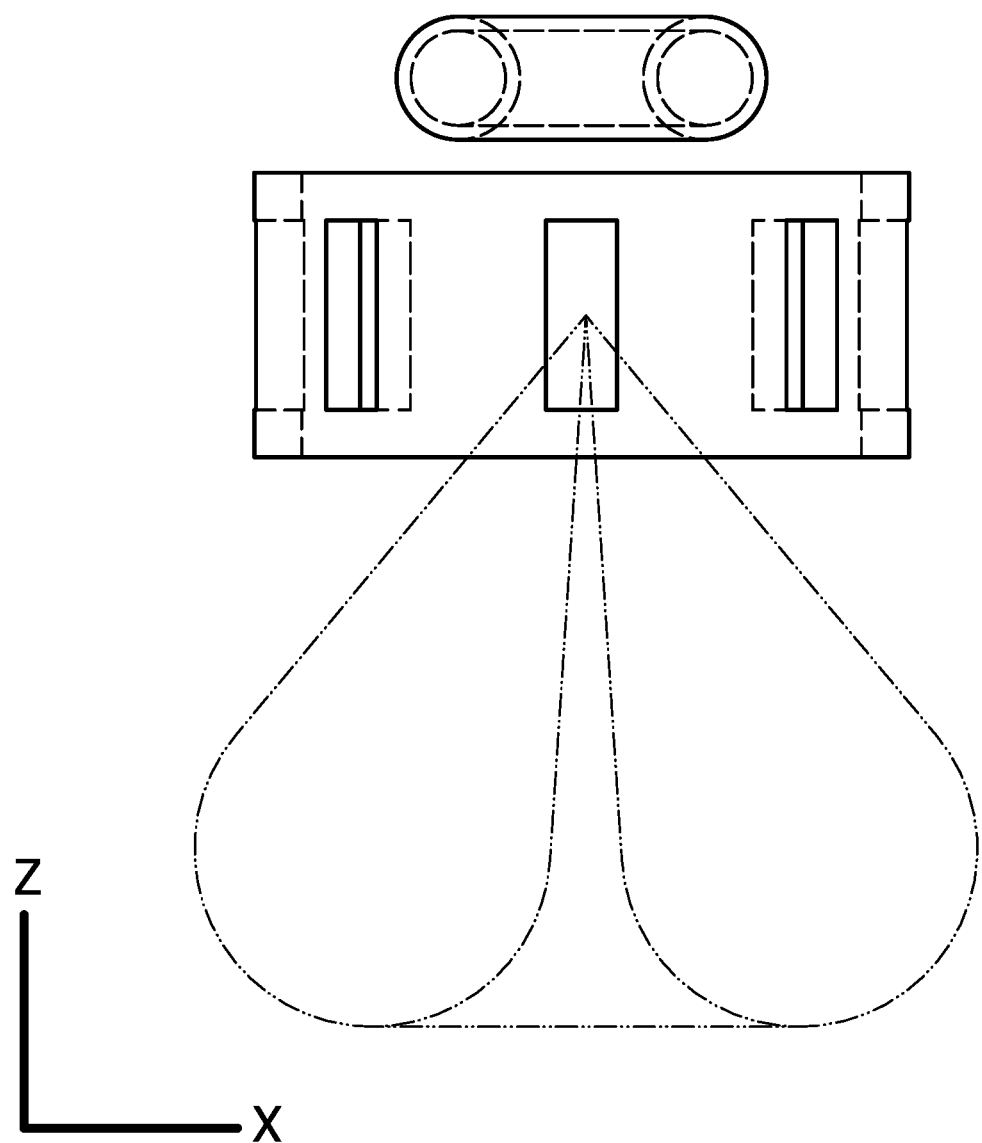
FIG. 10 shows a radiation pattern with the force ring, in accordance with aspects of the present disclosure.
Figure 11:
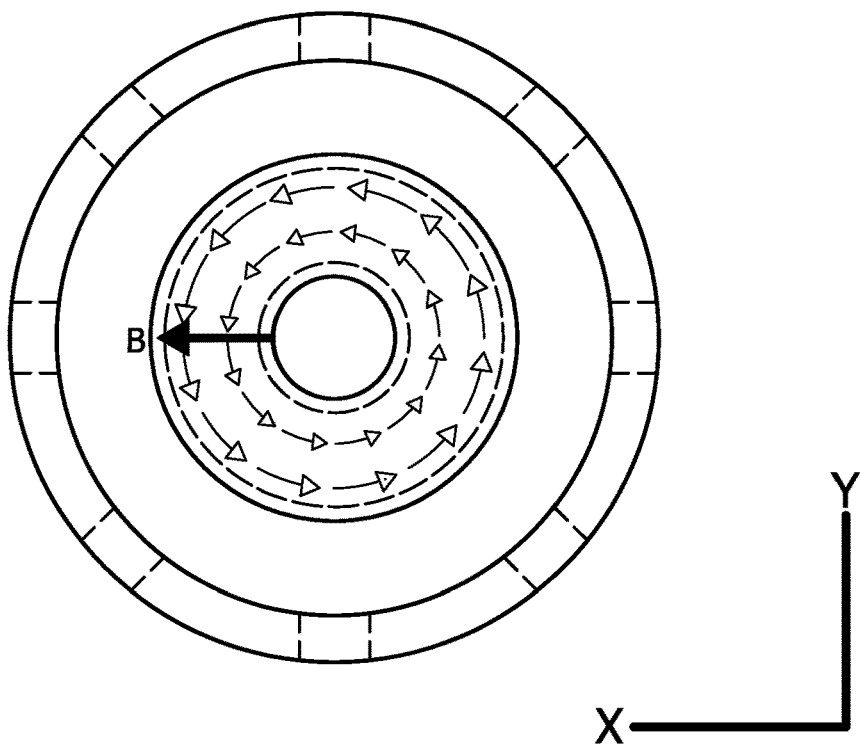
FIG. 11 shows clockwise and counter-clockwise currents in the force ring, in accordance with aspects of the present disclosure.
Figure 11:
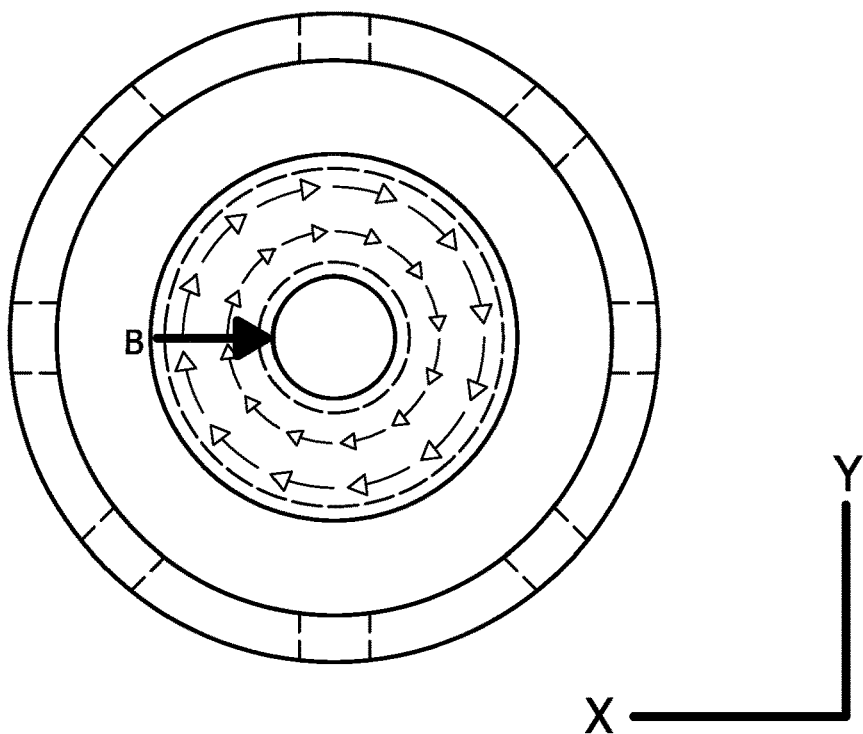

Evidently, according to the direction of the observed radiation (z axis), it is logical to understand that the ring will receive in its electrons or Cooper pairs the force due to the electrical component of the Lorentz equation. This is F=q E, which is why a circulating electrical current generated by the energy of the electrical field is produced in the ring. This energy use reduces the radiation intensity observed in the vicinity of the ring as shown in FIG. 10:

The currents circulating in the force ring (counter-clockwise and clockwise) are shown in FIG. 11. The change of direction of the electric current caused by the phase change in the signal of the antennas is, of course, simultaneous with the change in the direction of the magnetic flux.

The Cooper pair electrons in motion then experience, in each cycle of the wave, the change in the direction of the velocity due to the energy contribution of the magnetic field, resulting in the driving force F=q (v×B), which is shown in FIG. 12.

With the current circulating in the ring, it is clear that, according to the location of the ring on the z axis (not only is the direction of the magnetic field most parallel to the plane (x-y) sought, but also for there to be no induction that would generate a magnetic field opposite to the incident field), the optimal net resulting force (maximized on the z axis) is obtained, which is experienced in each phase always in the same direction, given that the corresponding electric and magnetic fields likewise change direction. A distance of Lambda/2, measured from the origin of coordinates, is proposed.

Figure 13:
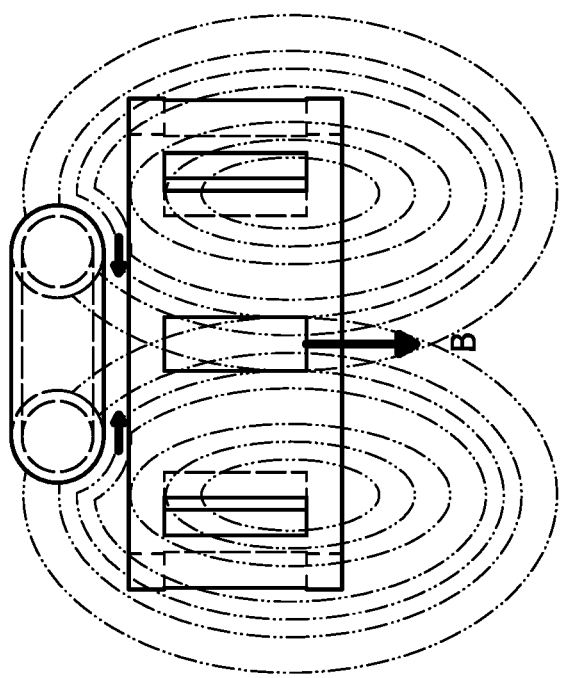
FIG. 13 shows a magnetic flux on the surface of the ring, in accordance with aspects of the present disclosure.
Figure 13:
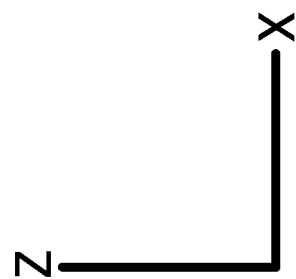

It is easy to obtain the necessary thrust given the natural characteristics of the behavior of the electromagnetic fields in the proposed geometry. FIG. 13 shows the direction of the magnetic field, which follows the surface of the ring, thus optimizing the vector product that provides the force.

Knowing that the invention proposes an ordered radiation, high power values can be obtained given the resonances in the cylindrical cavity (total efficiencies of more than 5000 have been achieved in the simulator). The capacities in the treatment of higher power levels in existing semiconductors and the capacity for producing soft ferrites with higher permeability values at high frequencies also contribute to achieving more significant forces.

Figure 14:
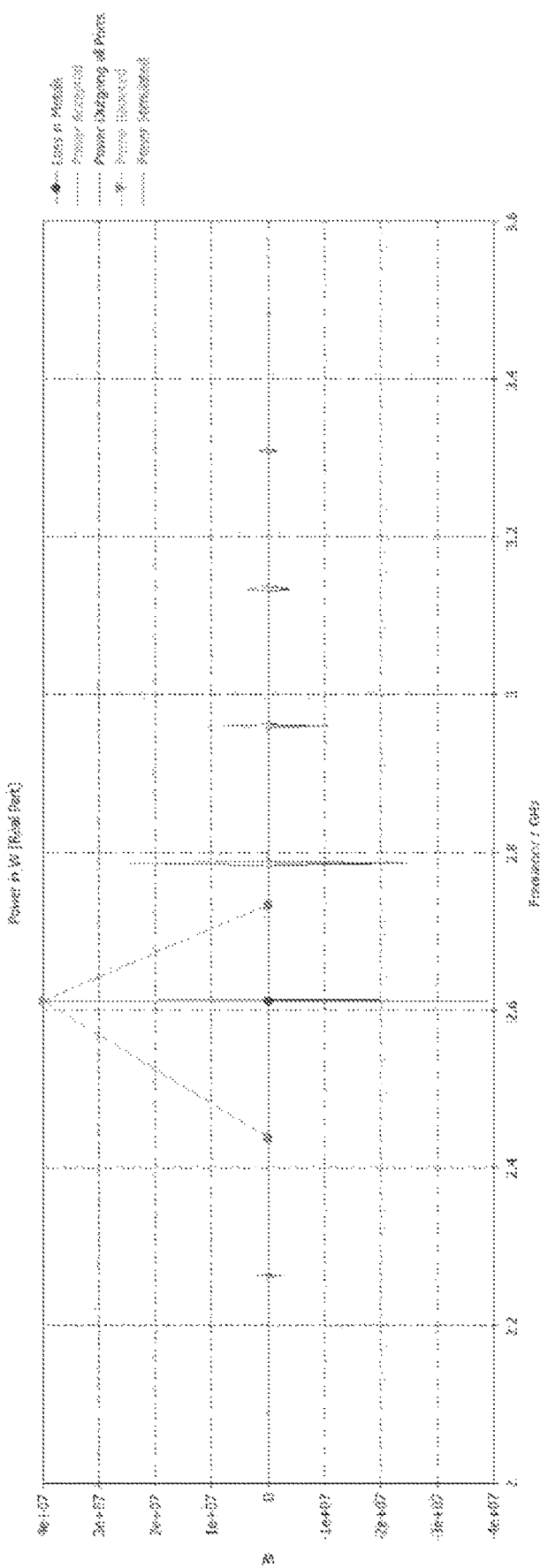
FIG. 14 shows resonance behavior inside the cavity, in accordance with aspects of the present disclosure.

FIG. 14 shows that the proposed geometry provides the appropriate resonance behavior for different frequency values. Considerable efficiencies in the radiated power are obtained for the highest resonance frequency. The orange line in FIG. 14 shows the behavior of the accepted power for different frequency values.

Based on the above, it is clear to understand that the achievement of the invention is to reproduce, in each phase of the radiated wave, the phenomenon observed in the fall of a magnet onto a copper conductor block, where the eddy currents (in this case, those that follow the circumference of the ring) are crossed by the incident magnetic field (in this case, the one in the plane of the ring).

Likewise, the levitation phenomenon observed when a magnet is placed near a superconducting element, the currents generated on the surface of the superconductor do not cease due to zero resistance in the movement of the charges (Cooper pairs) on the superconducting surface (for this case, those that follow the circumference of the ring), whereby the magnetic field of the magnet is "deflected," due to the known expulsion of the magnetic fields inside the superconductor. (In this case, the one in the plane of the ring).

Because the net driving force is obtained by the force experienced by the electric charges on the surface of the ring, it is logical to find that in the case of using a non-superconducting ring, the energy losses due to the displacement of the charges are not very significant, given that the movement imparted to them is due to the incidence of the high-frequency clockwise/counter-clockwise electrical field that the ring experiences on its radiated surface.

Figure 15:
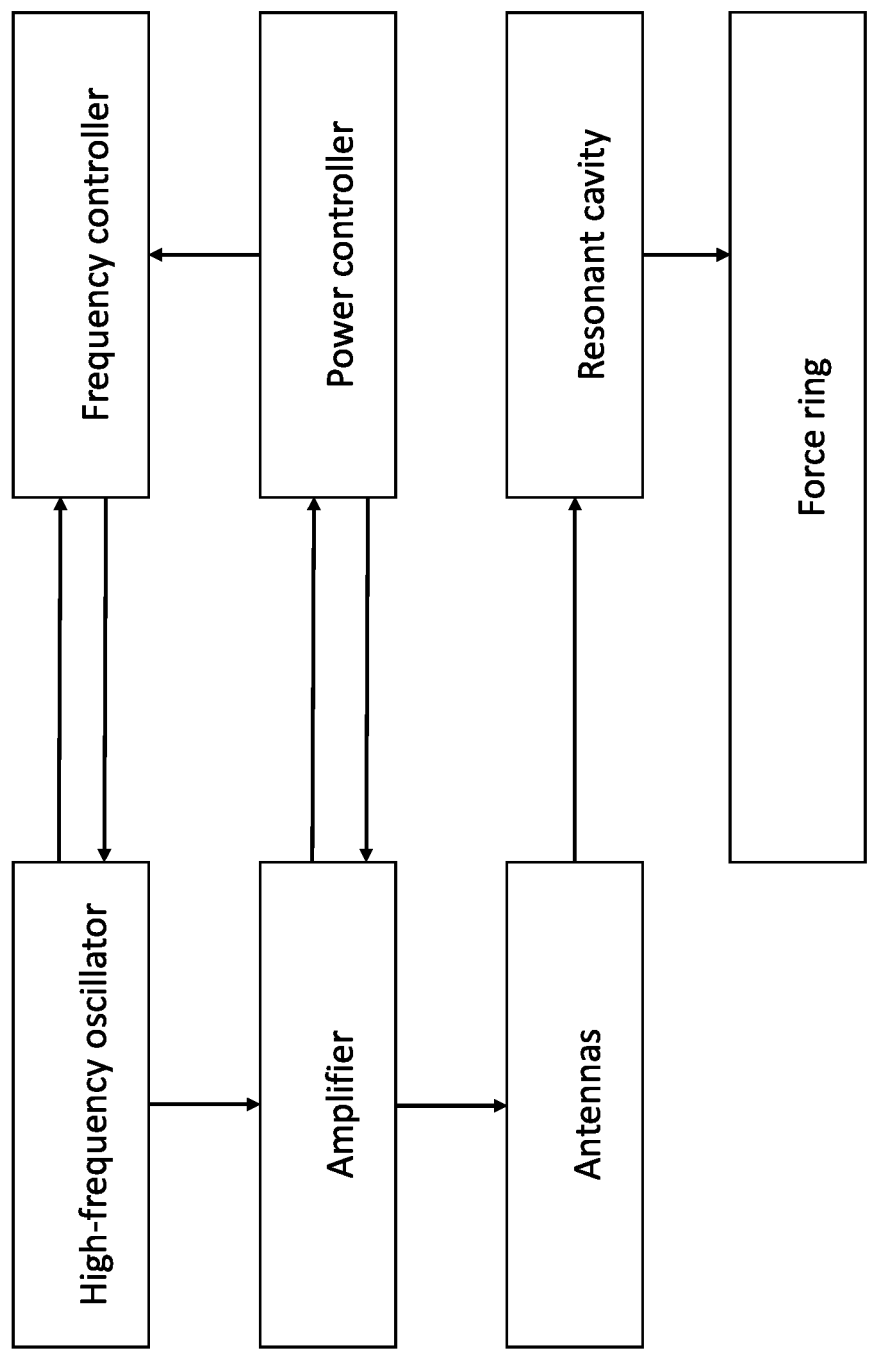
FIG. 15 shows a control diagram, in accordance with aspects of the present disclosure.

The opposite occurs with the walls of the resonant cavity, where the losses obtained by the circulation of the current due to the excitation of the antennas and the reflection of the waves are obviously minimized by the superconducting materials. The control diagram of the invention is shown in FIG. 15.

I claim:

1. An electromagnetic drive capable of generating a driving force, characterized by emitting radiation on a force ring outside of a resonant cylindrical cavity, in which a driving force is generated and on whose inner surface, emitting antennas of electromagnetic waves are arranged.

2. The electromagnetic drive of claim 1, wherein the antennas thereof emit synchronized, horizontally polarized waves in the resonant cylindrical cavity.

3. The electromagnetic drive of claim 1, characterized by having a resonant cylindrical cavity with a conducting or superconducting cylindrical surface.

4. The electromagnetic drive of claim 1, characterized by having a force ring with a conducting or a superconducting surface.

5. The electromagnetic drive of claim 1, comprising functional components.

6. The electromagnetic drive of claim 1, wherein the force ring is a toroidal shape.

7. The electromagnetic drive of claim 1, wherein the emitting antennas comprise three or more emitting antennas.

8. The electromagnetic drive of claim 1, wherein the generated driving force includes Lorentz force.

\* \* \* \* \*